United States Patent [19]

Fiorucci et al.

[11] 4,367,213

[45] Jan. 4, 1983

[54] USE OF SELECTED CATALYZED HYDRAZINE COMPOSITIONS TO REDUCE HEXAVALENT CHROMIUM [CR(VI)]

[75] Inventors: Louis C. Fiorucci; Michael E. Johnson, both of Hamden, Conn.

[73] Assignee: Olin Corporation, New Haven, Conn.

[21] Appl. No.: 373,307

[22] Filed: Apr. 29, 1982

[51] Int. Cl.$^3$ .............................................. C01G 37/02
[52] U.S. Cl. ..................................... 423/607; 423/55; 210/720; 210/757
[58] Field of Search ........................ 423/53, 351, 607; 210/720, 757

[56] References Cited

U.S. PATENT DOCUMENTS

| | | |
|---|---|---|
| 4,026,664 | 5/1977 | Noack . |
| 4,079,018 | 3/1978 | Noack . |
| 4,086,150 | 4/1978 | Kindl et al. ........................ 423/607 |
| 4,124,500 | 11/1978 | Arghiropoulos et al. ........... 210/757 |
| 4,268,486 | 5/1981 | Noack et al. . |

OTHER PUBLICATIONS

Olin Corporation Application Data Sheet entitled "Hydrazine for Chromium (VI) Reduction", published 1981.
Olin Corporation Data Sheets for Scav-Ox ® II and Scav-Ox Plus ®, published 1980 and 1981.
Product brochure by Olin Corporation for Scav-Ox ® hydrazine products.

Primary Examiner—Herbert T. Carter
Attorney, Agent, or Firm—William A. Simons

[57] ABSTRACT

Disclosed is a process for reducing hexavalent chromium [Cr(VI)] in aqueous solutions to trivalent chromium [Cr(III)] by reacting a catalyzed hydrazine composition with the hexavalent chromium at a pH in the range from about 6.0 to about 8.0 to form an aqueous slurry of trivalent chromium compound, said catalyzed hydrazine composition comprising (a) a hydrazine compound,
(b) at least 0.0005 parts by weight of a quinone compound per one part of hydrazine compound; and, preferably;
(c) at least about 0.0005 parts by weight of an organometallic complex per part of hydrazine compound, said organometallic complex being the reaction product of:
   (i) a hydroxide selected from the group consisting of cobaltous hydroxide and manganous hydroxide; and
   (ii) at least one organic ligand selected from the group consisting of unsubstituted and substituted amino derivatives of carboxylic acids and salts thereof.

The solid particles of trivalent chromium may then be separated from the aqueous solution by conventional means (e.g., filtration).

10 Claims, No Drawings

USE OF SELECTED CATALYZED HYDRAZINE COMPOSITIONS TO REDUCE HEXAVALENT CHROMIUM [CR(VI)]

BACKGROUND OF THE INVENTION

1. Field of the Invention

The present invention relates to the use of certain catalyzed hydrazine compositions to reduce chromium(VI) to chromium(III).

2. Description of the Prior Art

Hydrazine ($H_2H_4$) is one of the basic inorganic chemicals. It is precursor to numerous chemicals. Furthermore, it has many uses itself. In particular, one known use is to reduce chromium in the hexavalent state, Cr(VI), to Cr(III). This reaction is necessary to remove chromium contaminants, such as chromic acid or dichromate salts, from waste streams by filtration. See Olin Corporation Application Data Sheet entitled "Hydrazine For chromium(VI) Reduction" published in 1981. One specific application is to remove hexavalent chromium from aqueous sodium chlorate solutions. See U.S. Pat. No. 4,268,486, which issued on May 19, 1981, to Noack and Manke. This patent is incorporated herein by reference in its entirety.

The above-cited prior art processes are generally effective for removing hexavalent chromium from aqueous solutions; however, they have one slight drawback. The use of uncatalyzed hydrazine as a reducing agent of Cr(VI) proceeds slower than desired at a neutral pH. This relative rate of reaction raises the cost of employing hydrazine in those instances.

Separately, catalyzed hydrazine compositions have been used for many applications [although not for the reduction of Cr(VI) ions]. One use is as an oxygen scavenger in boiler systems. See U.S. Pat. No. 4,079,018, which issued to Noack on Mar. 14, 1978. This patent is incorporated herein by reference in its entirety.

BRIEF SUMMARY OF THE INVENTION

The present invention, therefore, is directed to a process for reducing hexavalent chromium [Cr(VI)] in aqueous solutions to trivalent chromium [Cr(III)], which comprises reacting a catalyzed hydrazine composition with the hexavalent chromium at a pH in the range from about 6.0 to about 8.0 to form an aqueous slurry of trivalent chromium compound [Cr(III)], said catalyzed hydrazine composition comprising (a) a hydrazine compound, and
(b) at least 0.0005 parts by weight of a quinone compound per one part of hydrazine compound.

DETAILED DESCRIPTION

Any aqueous solution having a pH in the range from about 6.0 to about 8.0 and containing hexavalent chromium may be treated according to the process of this invention. Such solutions may be used in a number of applications: metal plating, corrosion inhibitors for cooling systems, chemical pigments, leather tanning, textiles, and the sodium chlorate solutions as used in U.S. Pat. No. 4,268,486, mentioned above.

Examples of hexavalent chromium compounds include sodium chromate ($Na_2CrO_4$), sodium dichromate ($Na_2Cr_2O_7$), chromic acid ($H_2CrO_4$), potassium dichromate, potassium chromate, mixtures thereof, and the like. Throughout this specification and claims, when reference is made to hexavalent chromium, it is to be understood that any source of water-soluble hexavalent chromium may be substituted with equivalent results.

The amount of hexavalent chromium in the aqueous solution to be treated by this invention will vary depending upon the application. Generally, from about 5 to about 1000 parts by weight of hexavalent chromium per million parts (ppm) of solution may be so treated. However, it should be recognized that the present invention is not to be limited to any particular amounts of hexavalent chromium in an aqueous solution.

The hydrazine compound employed in the compositions of the present invention may be hydrazine itself or any similar hydrazine compound which functions as a reducer of hexavalent chromium. Thus, hydrazine compounds such as methylhydrazine, ethylhydrazine, propylhydrazine, butylhydrazine, 1,1-dimethylhydrazine, 1,1-dibutylhydrazine, and higher alkylated hydrazine compounds, hydroxy alkyl hydrazine, for example, hydroxyethyl hydrazine, as well as aromatic and aralkyl hydrazine compounds, may be employed. The hydrazine compound may be any of these or a mixture of these and may be used in anhydrous form or in an aqueous solution.

Most preferred of the above hydrazine compounds is hydrazine itself. Moreover, an aqueous solution of hydrazine is preferred when the composition is to be used in water-based corrosive environments. And, when organic fluid environments are involved, hydrazine may be used in an organic solution, e.g., in a lower alkylene glycol solution. Furthermore, in addition to the above hydrazine compounds, inorganic and/or organic salts thereof may be employed to replace part or all of the hydrazine compounds wherever they are compatible with the fluidic system. Suitable inorganic hydrazine compounds which may be used include hydrazine phosphate, hydrazine monohydrochloride and dihydrochloride, hydrazine monohydrobromide and the dihydrobromide, monohydrosulfate and dihydrosulfate, and the like. Of course, if these latter salts are employed, possibly undesirable anions may become present in the mixture.

The hydrazine compound is added to an aqueous solution containing hexavalent chromium to form an aqueous slurry of solid particles of trivalent chromium compound and nitrogen. This reaction is illustrated by the following Equation (A), wherein $H_2CrO_4$ is the hexavalent chromium compound:

$$3N_2H_4 + 4H_2CrO_4 \rightarrow 4Cr(OH)_3 + 3N_2 + 4H_2O \qquad (A)$$

The nitrogen gas may be collected or otherwise disposed of.

Sufficient hydrazine compound is preferably added to the aqueous solution to provide a molar ratio of hydrazine compound to hexavalent chromium in the aqueous solution from about 0.75:1 to about 20:1, more preferably from about 1:1 to about 10:1.

At a pH from about 6.0 to about 8.0, the formed trivalent chromium will begin to precipitate from the aqueous solution and an aqueous slurry will thus be formed.

The resultant removal of the trivalent chromium compound such as $Cr(OH)_3$ from the aqueous solution may be carried out by a conventional solid-liquid separation tecnique, such as by settling, filtering, centrifuging, and the like. Filtration is the preferred form of solid-liquid separation. One skilled in the art will recognize that any other suitable solid-liquid separation technique may be employed.

It has now been found that the reaction between hydrazine and hexavalent chromium may be catalyzed by use of selected amounts of a quinone compound. Among the quinone compounds which may be used are the para-quinones, para-hydroquinones, para-naphthoquinones, para-anthraquinones, para-hydronaphthoquinones, para-hydroanthraquinones, and the like, as well as their substituted derivatives. These include alkyl and aryl substituted quinone compounds as well as those having hydrophilic substituents. Among the desired quinone compounds which may be used are the alkylated and arylated para-quinones and para-hydroquinones having 1 to about 10 carbon atoms in the substituent, and those having substituents which are either derivatives of carboxylic acids, sulfonic acids, carboxylic acid alkali metal salts, or sulfonic acid alkali metal salts. Preferred are the lower alkyl para-quinones and para-hydroquinones having 1 to 5 carbon atoms in the alkyl substituents. Of these, the most preferred is methylhydroquinone, also known as toluhydroquinone.

The quinone compound is used in amounts of at least 0.0005 parts, preferably in the range of from about 0.001 to 0.1, and more preferably in the range of from about 0.005 to about 0.02, parts by weight with one part by weight of the hydrazine compound. Amounts of quinone compound below the lowest limit cited herein start to lose the desired effect. Furthermore, amounts of quinone compounds above about 0.1 part by weight are uneconomical and do not add anything to the present compositions. However, since it may be desirable to store and/or ship these compounds in concentrated form, there is no upper limit as to amount of quinone compound in the compositions of the present invention.

In a preferred embodiment of the present invention, it is desirable to employ a certain amount of selected organometallic complexes as additional catalysts with the quinone compounds. Specifically, the organometallic complexes used in the process of the present invention are the reaction products of cobaltous or manganous hydroxide and selected organic ligands. In most cases, the cobaltous hydroxide [Co(OH)$_2$] is favored over manganous hydroxide [Mn(OH)$_2$]. However, both hydroxides, along with unstable hydroxides such as cobaltic or manganic hydroxides, are suitable for the present invention. These latter forms [i.e., Co(OH)$_2$ and Mn(OH)$_2$] normally will quickly reduce down to the cobaltous or manganous form in the presence of the above hydrazine compounds. Cobaltous and manganous hydroxide are both available commercially in various forms (e.g., "hydrate" or a dry powder, aqueous suspension or slurries and the like) which can be readily used in the present invention.

In order to form these organometallic complexes, the above hydroxides are reacted with one or more organic ligands selected from the group consisting of unsubstituted and substituted amino derivatives of carboxylic acids and salts of these unsubstituted and substituted derivatives. These organic ligands are aliphatic or aromatic compounds which may have only one amino group or may have two or more amino groups, as more fully described below. The substituents which may be part of the organic ligand include any which do not hinder the formation of the organometallic complex or interfere with the oxygen scavenger accelerating function of the compositions of the present invention and will include alkyl, aralkyl, alkaryl, and aryl groups, e.g., having about 1 to about 14 and preferably about 1 to about 7 carbon atoms, as well as inorganic substituents such as the sulfonic acid radical and the like. These inert substituents may be located in any of the positions not occupied by the aforesaid amino radical or radicals. For example, these inert substituents may be located on A in Formula (I) shown below or on Y in Formula (VII) shown below. The salt forms of these organic ligands include the replacement of the hydrogen in the carboxylic acid radical of the ligand with a suitable cation, e.g., metal ion or ammonium or hydrazinium, which is capable of being replaced by a cobaltous or manganous ion. See the definition of B in the formulas below.

The organic ligands which may be used in forming the organometallic complexes used in the process of the present invention include those having the general formula:

wherein A is a branched or straight chain alkylene having 1 to about 10 carbon atoms, B is hydrogen or any suitable cation, e.g., metal ion or ammonium or hydrazinium, which is capable of being replaced by a cobaltous or manganous ion; and $R_1$ and $R_2$ are each independently selected from the group consisting of hydrogen, alkyls, aryls, the radical:

wherein A and B are defined above, and the radical:

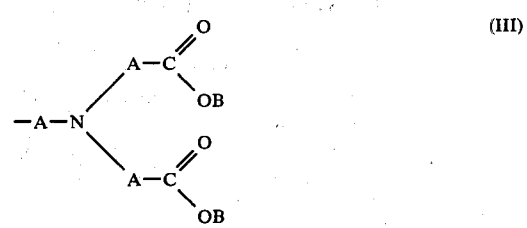

wherein each A and B are independently selected from the groups defined for A and B above, respectively.

Desirably, the ligand used in preparing the process of the present invention is one having the structure of Formula (I) above wherein A has 1 to 4 carbon atoms, $R_1$ and $R_2$ are each independently selected from the group consisting of hydrogen, alkyls having 1 to 10 carbon atoms, aryls having 6 to 14 carbon atoms, and the radicals of Formulas (II) and (III) above wherein A has 1 to 4 carbon atoms. Preferably, the ligand is one having the structure of Formula (I) above wherein A has 1 to 3 carbon atoms and $R_1$ and $R_2$ are each independently selected from the group consisting of hydrogen, alkyls having 1 to 4 carbon atoms, and the radicals of Formulas (II) and (III) above wherein A has 1 to 3 carbon atoms.

Exemplary of the most preferred ligands are (1) glycine and its salts, having the formula:

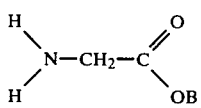

(IV)

(2) nitrilotriacetic acid (NTA) and its salts, having the formula:

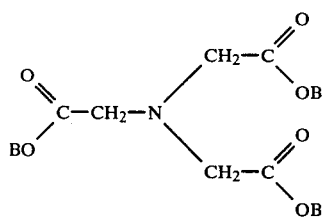

(V)

and (3) ethylenediamine tetraacetic acid (EDTA) and its salts, having the formula:

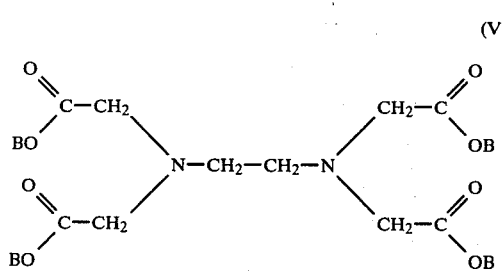

(VI)

wherein B for each of Formulas (IV) through (VI) is as defined above, and especially wherein B is hydrogen.

Further, in addition to, though less desirable than the compounds represented by the foregoing, the organic ligands which may be used in forming the organometallic complexes used in the process of the present invention also include those having the general formula:

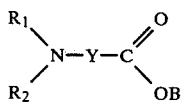

(VII)

wherein B, $R_1$, and $R_2$ are as defined above, and wherein Y is a substituted or unsubstituted orthoarylene biradical.

Of the compounds represented by Formula (VII) above, desirably Y is an ortho-phenylene or toluene or naphthalene radical, and $R_1$ and $R_2$ are each independently selected from the group consisting of hydrogen, alkyls having 1 to 10 carbon atoms, aryls having 6 to 14 carbon atoms, and the radicals of Formulas (II) and (III) above wherein A has 1 to 4 carbon atoms. Of the compounds represented by Formula (VII) above, preferred are those wherein Y is an ortho-phenylene or toluene or naphthalene radical, and $R_1$ and $R_2$ are each independently selected from the group consisting of hydrogen, alkyls having 1 to 4 carbon atoms, and the radicals of Formulas (II) and (III) wherein A has 1 to 3 carbon atoms.

Exemplary of the compounds represented by Formula (VII) are the following:

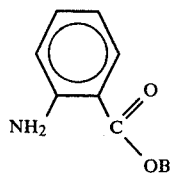

(VIII)

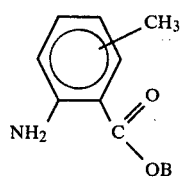

(IX)

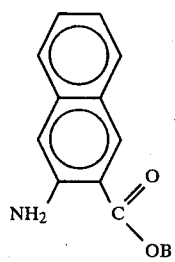

(X)

wherein, as applied to each of Formulas (VIII), (IX), and (X), B has the significance indicated above.

In forming the organometallic complexes, the hydroxide is reacted with the organic ligand so that about 0.1 to about 20 or even more gram-moles, and preferably about 0.5 to about 5 gram-moles of ligand are used per gram-atom of metal ion. Within these ranges, the optimum ratios of these two reactants will in general depend upon the particular ligand which is employed. Illustrative optimum ratios will be from about 0.8 to about 1.5 gram-moles of EDTA per gram-atom of metal ion, from about 1.6 to about 3.0 gram-moles of NTA per gram-atom of metal ion and from about 2.0 to about 4.5 gram-moles of glycine per gram-atom of metal ion.

These two components may advantageously be combined and reacted at room temperature and at atmospheric pressure. However, lower or higher temperatures and negative or positive pressures may be employed, if desired. Thus, temperatures ranging from about 10° or lower to about 100° C. or higher, and preferably from about 20° to about 50° C., and pressures from as low as 5 psi up to about 30 psi, and preferably within the range of from about 10 to about 15 psi may be used. At any rate, it can be seen that any combination of temperature and pressure may be used in preparing the organometallic complex provided that there is no significant detrimental effect on the reaction or on the desired products.

The reaction of the hydroxide and the organic ligand generally occurs in a reasonably short period of time and a significant amount of organometallic complex is obtained within a matter of minutes. The resulting organometallic complex may be dissolved in the reaction mixture or it may precipitate out of the reaction mixture. Regardless of the particular form of the organometallic complex, the complex is compatible with the reaction mixture and may be stored therein for an indefinite period of time. Because the reaction is usually completed in most cases somewhat in less than one hour and because the desired complex may be stored in the reaction mixture, there is no criticality to the maximum residence time involved in the reaction between the hydroxide and the organic ligand used in the present invention. If or when desired, the organometallic complex may be separated from the reaction mixture by any conventional means, e.g., by filtration or by distillation of the solvent. Alternatively, the organometallic complex need not be separated from the reaction mixture and the entire entity may be used as a component for the process of the present invention.

In those embodiments of the present invention where organometallic complexes as described above are combined with the hydrazine compound and the quinone compound, at least 0.0005 parts, preferably in the range of about 0.002 parts to about 0.10 parts, by weight of the organometallic complex are used per every one part by weight of the hydrazine compound. In the most preferred embodiment of the present invention, from about 0.005 to about 0.03 parts by weight of the organometallic complex are employed per part of the hydrazine compound. The use of amounts of organometallic complex below the lowest limit cited above results in a certain reduction in the catalytic effect on the oxygen-scavenging action of the hydrazine compound. The use of amounts of organometallic complex above the relative 0.1 parts by weight normally is uneconomical and does not give any further improvement to the desired catalytic action. However, it may be desirable to store and/or ship the compositions in a concentrated form whereby the amount of organometallic complex is greater than this upper limit. Such concentrated solutions are also encompassed by the present invention.

In one preferred embodiment, the organometallic complex, the quinone compound, and the hydrazine compound may be combined in one step prior to use of the resulting composition as a reducer of hexavalent chromium, or the three components may be added separately or in any suitable combination to the fluid in the system to be treated. As alternatives to combining the organometallic complex and the quinone compound with the hydrazine compound either before or after being added to the fluidic corrosive environment to be treated, other approaches may advantageously be used. In one preferred embodiment, the organic ligand may be dissolved in a hydrazine compound solution and the cobaltous or manganous hydroxide, either in solid or suspension form, may subsequently be combined with the organic ligand-hydrazine compound solution, either before or after the organic ligand-hydrazine compound solution is added to the fluidic system to be treated, and the quinone compound may be added at any time.

In another preferred embodiment of the present invention, the hydroxide may first be suspended in a hydrazine compound solution and then the organic ligand may be combined therewith either before or after the hydroxide-hydrazine compound solution is added to the fluidic system to be treated and the quinone compound may be added to any component at any time. It should be noted that in these embodiments wherein the hydroxide and the organic ligand are not combined until added to the fluidic system to be treated, the organometallic complex is formed in situ. It should also be noted that regardless of the particular combining approach taken, the relative amounts of hydrazine compound, organic ligand, hydroxide, and quinone compound used are those set forth above. Therefore, it is clearly understood that the order of addition of the above-mentioned components to the environment is not critical and any suitable method of addition which results in the desired catalytic effect is encompassed within the scope of the invention.

After reaction of the catalyzed hydrazine composition with the hexavalent chromium is complete and the formed trivalent chromium solids are removed from the aqueous solution, those solid particles may be washed if desired, and then oxidized to the hexavalent state for use again (e.g., in electrolytic sodium chlorate cells). Alternatively, they may be simply disposed of.

The temperature of the aqueous solution during reaction may be in the range from about 0° C. to about 150° C., and preferably in the range from about 20° C. to about 100° C. The reaction is generally carried out at atmospheric pressure, but super- or subatmospheric pressure may be used.

Either a batch or continuous operation can be used, although the continuous system is preferable.

The following examples and comparison define the invention more fully without any intention of being limited thereby. All parts and percentages are by weight unless otherwise specified.

EXAMPLES 1–5

Use of Hydrazine Catalysed with Methylhydroquinone to Reduce Hexavalent Chromium to Trivalent Chromium A 100 ppm stock hexavalent chromium solution (1 liter in volume) was prepared by dissolving 282.9 mg of previously dried primary standard grade potassium dichromate in a 1 liter flask and diluting with distilled water to produce a stock solution. Working solutions of various hexavalent chromium concentrations were then prepared by pipetting aliquots of the stock solution into 500 ml distilled water in volumetric flasks. For each working solution, the pH was then adjusted to 7.0 by the drop-wise addition of $0.1\overline{N}$ NaOH, and their absorbency measured on a Bausch & Lomb Model 70 spectrophotometer at 359 mn with a 1 cm path length. A calibration curve of absorbency vs. concentration gave a straight line with a correlation coefficient of 0.998.

For each example, 200 ml of the working solution was then pipetted into a 250 ml beaker equipped with a magnetic spin-bar and stirred on a stir plate. A Hamilton #701 microliter syringe was then used to add a catalyzed hydrazine solution to each beaker containing a working solution. The catalyzed hydrazine solution was made up of an aqueous solution containing 35% by weight hydrazine and 0.2% ±0.02% by weight methylhydroquinone. The amount of catalyzed hydrazine solution added to each beaker was six times the stoichiometric amount of $N_2H_4$ [see Equation (A) above] needed to react with all of the hexavalent chromium [Cr(VI)] present in the beaker. This equals a mole ratio of $N_2H_4$:CR(VI) of 4.5:1. The pH of each working solution was adjusted to 7.0 with $0.1\overline{N}$ $H_2SO_4$ and the timing started using a digital stopwatch. The solutions were allowed to stir for 1 minute to allow for complete mixing at which time a small portion of the mixture was placed in a cuvette, the absorbency measured on the spectrophotometer, and the remaining Cr(VI) concentration (in ppm) found from the previously prepared calibration curve.

The results are shown in Table I. It can be seen from Table I that the reduction of Cr(VI) to Cr(III) by catalyzed hydrazine proceeds rapidly and is essentially complete within 15 minutes.

TABLE I

| Time (min.) | Example # 1 | 2 | 3 | 4 | 5 |
|---|---|---|---|---|---|
| | Cr(VI) ppm | | | | |
| | 10 | 20 | 30 | 40 | 50 |
| 1 | 6.52 | 8.34 | 11.65 | 13.41 | 18.89 |
| 2 | 4.59 | 4.39 | 6.43 | 6.27 | 10.17 |
| 3 | 3.68 | 2.42 | 3.47 | 3.19 | 6.24 |
| 4 | 3.07 | 1.28 | 2.05 | 1.65 | 4.06 |
| 5 | 2.56 | 0.71 | 1.18 | 0.84 | 2.86 |
| 6 | 1.85 | 0.23 | 0.63 | 0.49 | 1.85 |
| 7 | 1.30 | 0.04 | 0.33 | 0.29 | 1.28 |
| 8 | 1.08 | −0.04 | — | 0.17 | 0.98 |
| 9 | 0.84 | — | — | 0.08 | 0.82 |
| 10 | 0.63 | — | — | 0.06 | 0.63 |
| 11 | 0.41 | — | — | — | 0.45 |
| 12 | 0.21 | — | — | — | 0.33 |
| 13 | — | — | — | — | 0.31 |

EXAMPLES 6–10

Use of Hydrazine Catalyzed with Methylhydroquinone, EDTA, and Cobalt Hydroxide to Reduce Hexavalent Chromium to Trivalent Chromium Using the same apparatus of Examples 1–5, the procedure was repeated except reduction was accomplished using an aqueous 35% w/w hydrazine solution catalyzed with 0.2% ±0.02% methylhydroquinone, 0.53% ±0.08% EDTA, and 0.14% ±0.01% $Co(OH)_2$. The results are shown in Table II.

TABLE II

| Time (min.) | Example # 6 | 7 | 8 | 9 | 10 |
|---|---|---|---|---|---|
| | Cr(VI) ppm | | | | |
| | 10 | 20 | 30 | 40 | 50 |
| 1 | 6.14 | 11.25 | 15.95 | 12.27 | 12.36 |
| 2 | 4.70 | 7.36 | 9.61 | 6.55 | 7.57 |
| 3 | 3.58 | 4.91 | 5.97 | 3.78 | 5.10 |
| 4 | 2.76 | 3.31 | 3.72 | 2.25 | 3.68 |
| 5 | 2.05 | 2.21 | 2.35 | 1.43 | 3.03 |
| 6 | 1.53 | 1.41 | 1.45 | 0.92 | 2.26 |
| 7 | 1.13 | 0.84 | 0.82 | 0.57 | 1.85 |
| 8 | 0.92 | 0.41 | 0.41 | 0.31 | 1.55 |
| 9 | 0.68 | 0.10 | 0.10 | 0.19 | 1.36 |
| 10 | 0.43 | 0.03 | 0.06 | 0.06 | 1.20 |
| 11 | 0.21 | — | — | — | 1.12 |
| 12 | 0.06 | — | — | — | 1.04 |
| 13 | — | — | — | — | 1.00 |
| 14 | — | — | — | — | 0.92 |
| 15 | — | — | — | — | 0.92 |

COMPARISON 1

Use of Uncatalyzed Hydrazine to Reduce Hexavalent Chromium to Trivalent Chromium Using the apparatus of Examples 1–10, six times the stoichiometric amount of an aqueous 64% w/w uncatalyzed hydrazine solution was added, with stirring, to a 200 ml aliquot of solution containing a known concentration of hexavalent chromium. The pH of the resulting mixture adjusted to 7.0 by the drop-wise addition of 0.1N $H_2SO_4$ or NaOH, and the time recorded. A sample was then withdrawn at a noted time and the hexavalent chromium concentration found using the 1,5-diphenyl-carbohydrazide method described on pg. 156 of the 13th Edition of Standard Methods for the Examination of Water and Waste Water. The results are shown in Table III.

TABLE III

| Time (min.) | Cr(VI) ppm |
|---|---|
| 0 | 23.00 |
| 6 | 18.50 |
| 18 | 9.50 |
| 30 | 2.75 |
| 60 | 0.75 |
| 90 | 0.25 |

Comparing the results of Examples 1–10 to Comparison 1, it can be readily seen that the catalyzed hydrazine composition of the present invention reacts much faster.

What is claimed is:

1. A process for reducing hexavalent chromium [Cr(VI)] in aqueous solutions to trivalent chromium [Cr(III)] which comprises
   reacting a catalyzed hydrazine composition with said hexavalent chromium at a pH in the range from about 6.0 to about 8.0 to form an aqueous slurry of trivalent chromium compound [Cr(III)], said catalyzed hydrazine composition comprising
   (a) a hydrazine compound, and
   (b) at least 0.0005 parts by weight of a quinone compound per one part of said hydrazine compound.
2. The process of claim 1 wherein said formed trivalent chromium compound is separated from said aqueous solution.
3. The process of claim 1 wherein said hydrazine compound is hydrazine.
4. The process of claim 1 wherein said quinone compound is methylhydroquinone.
5. The process of claim 1 wherein said catalyzed hydrazine composition additionally contains at least about 0.0005 parts by weight of organometallic complex per part of said hydrazine compound, said organometallic complex being the reaction product of
   (i) a hydroxide selected from the group consisting of cobaltous hydroxide and manganous hydroxide; and
   (ii) at least one organic ligand selected from the group consisting of unsubstituted and substituted amino derivatives of carboxylic acids and salts thereof.
6. The process of claim 5 wherein said organic ligand is ethylenediamine tetraacetic acid (EDTA) and its salts.
7. The process of claim 1 wherein said aqueous solution contains from about 5 to about 1000 parts by weight of said hexavalent chromium per million parts of said aqueous solution.
8. The process of claim 1 wherein the molar ratio of hydrazine compound to said hexavalent chromium is from about 0.75:1 to about 20:1.
9. The process of claim 1 wherein said quinone compound is used in amounts from about 0.001 to about 0.1 parts by weight per one part of hydrazine compound.
10. The process of claim 5 wherein said organometallic complex is used in amounts from about 0.002 parts to about 0.1 parts by weight per one part of hydrazine compound.

* * * * *